(No Model.) 3 Sheets—Sheet 3.
W. J. LLOYD & W. PRIEST.
SEAT FOR VELOCIPEDES.
No. 448,969. Patented Mar. 24, 1891.
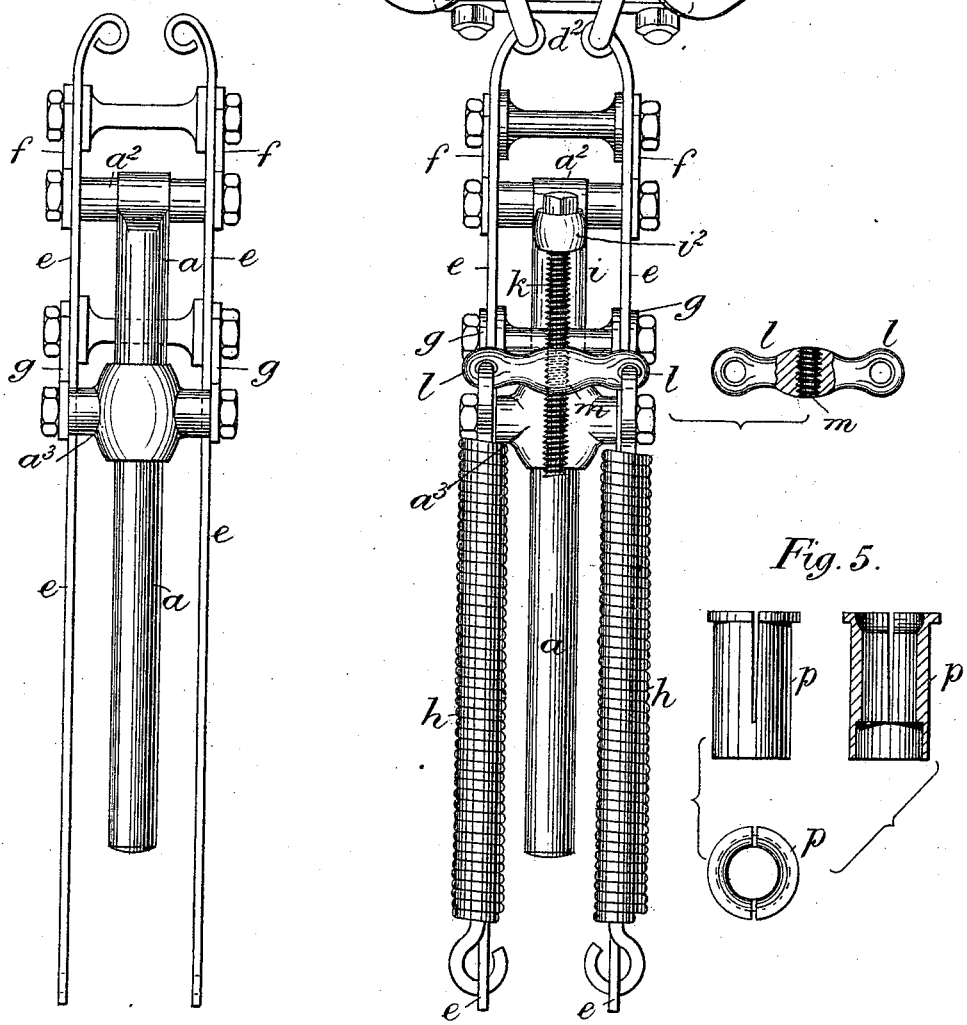
Witnesses:—
George Shaw
Richard Skerrett
Inventors:—
Walter John Lloyd
William Priest

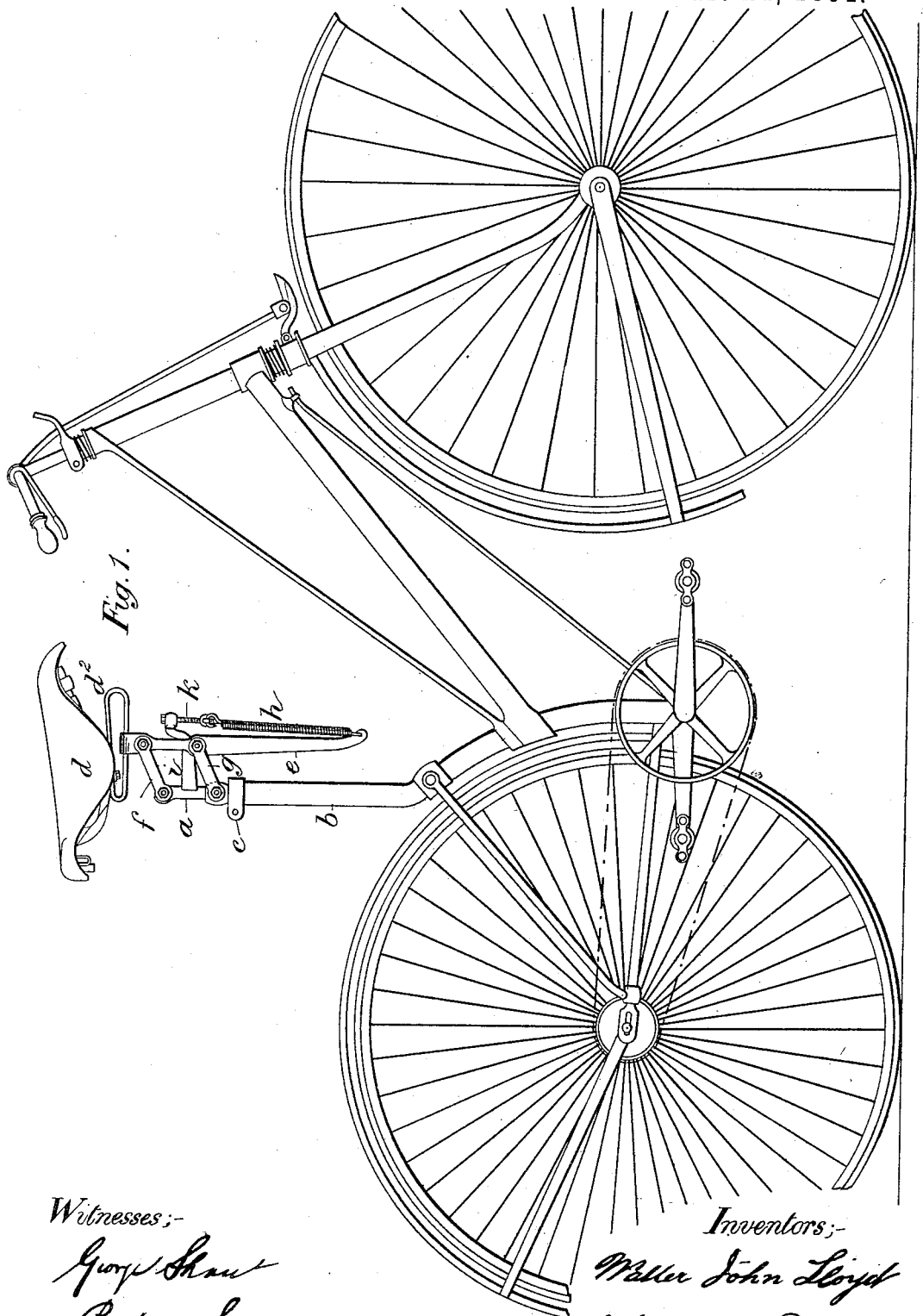

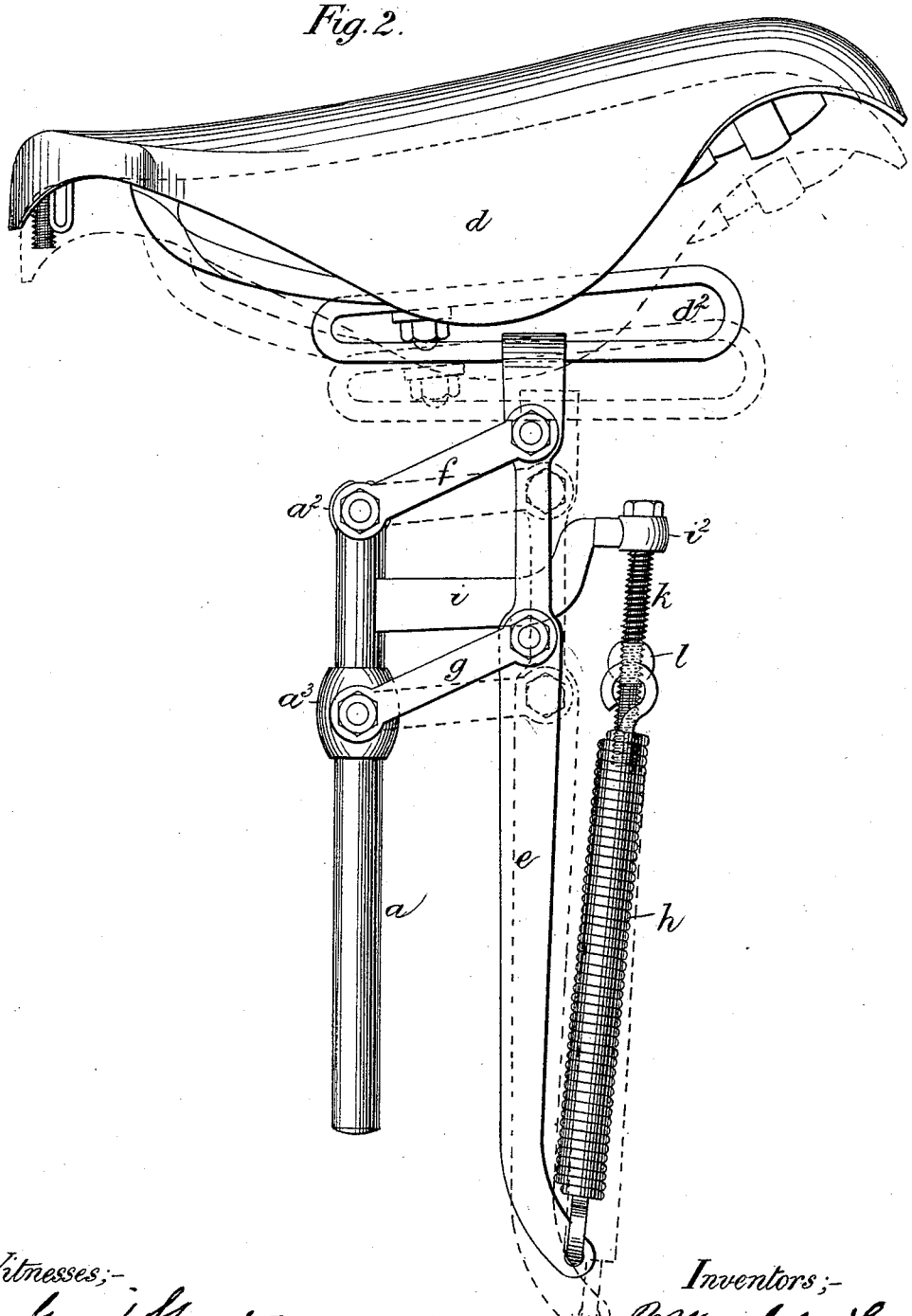

UNITED STATES PATENT OFFICE.

WALTER JOHN LLOYD AND WILLIAM PRIEST, OF BIRMINGHAM, ENGLAND.

SEAT FOR VELOCIPEDES.

SPECIFICATION forming part of Letters Patent No. 448,969, dated March 24, 1891.

Application filed November 29, 1890. Serial No. 373,086. (No model.) Patented in England May 18, 1889, No. 8,311; in France December 12, 1889, No. 202,544, and in Belgium December 12, 1889, No. 88,823.

*To all whom it may concern:*

Be it known that we, WALTER JOHN LLOYD and WILLIAM PRIEST, of Birmingham, England, subjects of the Queen of Great Britain, have invented certain Improvements in Connecting the Seats or Saddles of Bicycles, Tricycles, and other Velocipedes to the Bodies of the Same; and we do hereby declare that the following is a full, clear, and exact decription of the invention, which will enable others skilled in the art to which it appertains to make and use the same, and for which we have obtained patents in Great Britain, No. 8,311, May 18, 1889; France, No. 202,544, December 12, 1889, and Belgium, No. 88,823, December 12, 1889.

Our invention has for its object to connect the seats of bicycles, tricycles, and other velocipedes to the bodies of the same by an elastic connection capable of adjustment so as to suit riders of different weights.

To the adjustable seat-post, which is adjusted in the fixed socket of the framing, as is well understood, we fix at right angles two cross pins or axes, one of the said axes being at the top of the seat-post and the other preferably about three inches below the former. On each end of each of the said axes a short flat bar or link turns. The other ends of these links are jointed to vertical bars, which bars extend a short distance above their junction with the links. The said vertical bars have at top horizontal arms, to which the seat or saddle is fixed by screws or otherwise, or the tops of the vertical bars are directly connected to the spring-frame of the saddle. The said vertical bars in rising and falling are always preserved parallel to the adjustable seat-post by which they are carried. The said vertical bars, and consequently the seat or saddle, are pressed upward by means of one or more coiled springs, the tops of which are connected by an arm and adjusting-screw to the top of the seat-post, the bottoms of the said springs being connected to the bottoms of the vertical bars. When there is no rider on the saddle or seat, it takes its highest position. When the rider seats himself, his weight, operating through the saddle and vertical bars, puts the spring or springs into a state of tension, the said springs lengthening more or less, according to the weight of the rider. As the vehicle travels, the tremulous motion communicated to it by the asperities of the road is not transmitted, or is transmitted only to a limited extent, to the saddle and rider, the spring or springs by its or their rapid elongations and contractions neutralizing to a great extent the uneven motion of the vehicle.

By means of the adjusting-screw referred to the action of the spring can be regulated.

Figure 1 of the accompanying drawings represents in side elevation a Safety bicycle, to the body of which the seat or saddle is connected by an adjustable elastic connection constructed according to our invention. Fig. 2 represents in side elevation, and Figs. 3 and 4 represent elevations of opposite ends, the adjustable elastic connection detached, drawn to a larger scale. Fig. 5 represents an elastic or split collar for the tubular socket of the velocipede.

The same letters indicate the same parts in the several figures of the drawings.

$a$ is the cylindrical seat-post of the saddle, adjustable in the fixed socket $b$ of the framing of the bicycle (see Fig. 1) by means of the spring-clip $c$, as usual. The seat or saddle $d$ is not connected directly to the seat-post $a$, but is connected by means of an adjustable elastic connection constructed as follows:

$e\ e$ are two parallel bars, the upper ends of which are secured to the spring frame or support $d^2$ of the saddle or seat $d$, but we do not confine ourselves to any particular way of connecting the bars $e\ e$ to the seat or saddle or to any particular kind of saddle-support. The said vertical bars $e\ e$ are jointed by means of the two pairs of links $f f$ and $g g$ to the seat-post $a$, the said seat-post being provided with cross-axes $a^2 a^3$, to the ends of which the pairs of links $f g$ are jointed. The vertical bars $e\ e$ in rising and falling are always preserved parallel to the adjustable seat-bar $a$, to which they are connected by means of the pairs of links $ff$ and $gg$. The vertical bars $e\ e$ and saddle carried by them are pressed upward by the strong supporting coiled springs $h\ h$, by means of which springs the rider and the seat or saddle and connecting parts are supported and balanced, as hereinafter described. The bottoms of the said supporting-springs $h\ h$ are connected to the bottoms of the vertical bars $e\ e$, and the said springs are connected at top to the adjustable seat-post $a$ through the horizontal arm $i$, adjusting-screw $k$, and cross-piece $l$, having eyes at its ends, to which eyes the tops of the springs are hooked, as best seen in Fig. 3. The middle of the cross-piece $l$ is made into a screw-box $m$, in which the adjusting-screw $k$ works. The head of the adjusting-screw $k$ is pressed to its seat $i^2$ on the end of the horizontal arm $i$ on the seat-post by the coiled springs $h\ h$, so that while the said screw $k$ is capable of being rotated it is prevented from rising and falling. The result of this arrangement is that when the head of the screw is turned in one or other direction by a spanner the screw box $m$ of the cross-piece $l$ rises or falls upon the said screw, and the tension of the coiled springs $h\ h$ can be adjusted with great nicety to suit riders of different weights—that is, the springs can be so regulated as to balance the weight of the rider, the saddle, and connecting parts. When there is no rider on the saddle $d$, it takes its highest position, being raised and supported by the adjusted springs $h\ h$. When the rider seats himself on the saddle $d$, the said saddle and the vertical bars $e\ e$ descend, taking the dotted position indicated in Fig. 2, and the weight of the rider operating through the vertical rods $e$ puts the springs $h\ h$ into a state of tension, the said springs lengthening more or less according to the weight of the rider.

By the use of the adjustable elastic connection for the seat or saddle described and illustrated the tremulous motion communicated to the vehicle by the asperities of the road on which it is traveling is not transmitted, or is transmitted only to a limited extent, to the saddle and rider, the springs $h\ h$ by their rapid elongation and contraction neutralizing to a great extent the uneven motion of the vehicle.

For the purpose of enabling seat-posts of different diameters to be readily secured in the tubular socket $b$ of the bicycle-frame, we use with the seat-post a split or elastic collar of the kind represented in elevation, section, and plan in Fig. 5, and marked $p$. The said split or elastic collar $p$ is placed on the seat-post below the boss of the lower crossing axis $a^3$, and the mouth of the said elastic collar is cupped to fit on the lower part of the said boss. The collar $p$ is adjusted in the tubular socket $b$ to the proper height, and the adjusted seat-post is fixed in the said socket, and the said collar $p$ fixed on the seat-post by closing the clip $c$ (see Fig. 1) by its screw-pin.

Instead of using two supporting coiled springs, as described and illustrated, a single coiled spring may be used. In this case the single spring may be secured to a cross-piece at the bottom of the two bars $e\ e$ and at top to a short arm projecting from the middle of the cross-piece $l$, or three or more coiled springs may be used, and in place of coiled springs india-rubber springs may be used.

Our invention may be applied to tricycles and other velocipedes where the saddle or seat is supported after the manner in which the seat or saddle of a Safety bicycle or tricycle is supported.

Having now particularly described and ascertained the nature of our invention and the manner in which the same is to be performed, we declare that we claim as our invention—

The combination of the two parallel vertical bars $e\ e$, a seat or saddle connected with the upper ends of said bars, the post $a$, having cross-arms $a^2\ a^3$ and provided with a forwardly-projecting arm $i$, extended between and in front of the bars $e\ e$, the two pairs of links $f\ f$ and $g\ g$, that connect said vertical bars $e\ e$ with the cross-arms $a^2\ a^3$ of the post $a$, and an adjustable spring or springs $h$, connecting the forwardly-curved lower ends of the bars $e\ e$ with the end of the forwardly-projecting arm $i$ of the post $a$, substantially as shown and described.

Dated the 9th day of June, 1890.

WALTER JOHN LLOYD. [L. S.]
WILLIAM PRIEST. [L. S.]

Witnesses:
GEORGE SHAW,
RICHARD SKERRETT.